United States Patent [19]  
Oda et al.

[11] 4,168,361  
[45] Sep. 18, 1979

[54] RANDOM COPOLYMER OF PROPYLENE AND 1-BUTENE AND PROCESS FOR ITS PRODUCTION

[75] Inventors: Hidekuni Oda; Yozo Yamamoto, both of Iwakuni; Hirokazu Kajiura, Ohtake; Syuji Minami, Ohtake; Takao Ohno, Ohtake, all of Japan

[73] Assignee: Mitsui Petrochemical Industries, Ltd., Tokyo, Japan

[21] Appl. No.: 861,894

[22] Filed: Dec. 19, 1977

[30] Foreign Application Priority Data

Dec. 24, 1976 [JP] Japan ............................ 51-155068

[51] Int. Cl.$^2$ .......................... C08F 4/02; C08F 10/06
[52] U.S. Cl. ............................ 526/348.6; 252/429 B; 252/429 C; 526/97; 526/122; 526/124; 526/125; 526/151; 526/904; 526/906
[58] Field of Search ..................... 526/124, 125, 348.6

[56] References Cited

U.S. PATENT DOCUMENTS

| | | | |
|---|---|---|---|
| 3,238,146 | 3/1966 | Hewett et al. | 526/125 |
| 3,278,504 | 10/1966 | Eills et al. | 526/348.6 |
| 3,332,921 | 7/1967 | Cleary | 526/348.6 |
| 3,923,758 | 12/1975 | Carter et al. | 526/348.6 |

FOREIGN PATENT DOCUMENTS

| | | | |
|---|---|---|---|
| 2243633 | 3/1973 | Fed. Rep. of Germany | 526/124 |
| 1018341 | 1/1966 | United Kingdom . | |

*Primary Examiner*—Edward J. Smith  
*Attorney, Agent, or Firm*—Sherman & Shalloway

[57] ABSTRACT

A random copolymer consisting essentially of 40 to 90 mole% of propylene and 60 to 10 mole% of 1-butene, and having (A) a boiling n-heptane-insoluble content of not more than 5% by weight based on the weight of the copolymer, (B) a boiling methyl acetate-soluble content of not more than 2% by weight based on the weight of the copolymer, (C) a melting point, determined by differential thermal analysis, of 40 to 140° C., (D) an intrinsic viscosity, determined in decalin at 135° C., of 0.5 to 6 dl/g, (E) an elongation at break, measured by JIS K6301, of at least 300%, (F) a tensile strength at break, measured by JIS K6301, of at least 50 kg/cm$^2$, and (G) a haze, measured by JIS K6714, of not more than 40%.

The above copolymer has superior properties for production of various kinds of melt-shaped articles such as films, sheets, vessels and tubes, and can be obtained by copolymerizing propylene and 1-butene in the presence of a catalyst prepared from a solid complex containing magnesium, titanium and halogen, an organometal compound of a metal of Groups I to III of the periodic table, and an electron donor.

7 Claims, No Drawings

RANDOM COPOLYMER OF PROPYLENE AND 1-BUTENE AND PROCESS FOR ITS PRODUCTION

This invention relates to a random copolymer consisting essentially of propylene and 1-butene which has properties typical of both rubber and plastics as shown by its good transparency (a haze, measured by JIS K6714, of not more than 40%), freedom from surface tackiness, (a boiling methyl acetate-soluble content of not more than 2% by weight based on the weight of the copolymer), a low crystallinity (a boiling n-heptane-insoluble content of not more than 5% by weight based on the weight of the copolymer), and a melting point, measured by differential thermal analysis, of 40° to 140° C. More specifically, it relates to a new type of random copolymer of propylene and 1-butene which has superior properties for production of various kinds of melt-shaped articles such as films, sheets, vessels and tubes.

In particular, the invention relates to a random copolymer consisting essentially of 40 to 90 mole% of propylene and 60 to 10 mole% of 1-butene, and having (A) a boiling n-heptane-insoluble content of not more than 5% by weight based on the weight of the copolymer, (B) a boiling methyl acetate-soluble content of not more than 2% by weight based on the weight of the copolymer, (C) a melting point by differential thermal analysis (the point which is taken as peak temperature on the thermogram) of 40° to 140° C., (D) an intrinsic viscosity, measured in decalin at 135° C., of 0.5 to 6 dl/g, (E) an elongation at break, measured by JIS K6301, of at least 300%, (F) a tensile strength at break, measured by JIS K6301, of at least 50 kg/cm$^2$, and (G) a haze, measured by JIS K6714, of not more than 40%; and a process for producing the aforesaid random copolymer.

Vinyl chloride resins have gained the most widespread acceptance in applications which require soft or semirigid resins. However, the vinyl chloride resins have the defect that when articles made of these resins are incinerated for disposal, a corrosive toxic gas is generated, or the toxic monomer remaining in the articles and the plasticizers incorporated in the resins become hazardous. It has been desired therefore to utilize olefinic resins free from such troubles.

In these resins, ethylene resins have been used almost exclusively, and as propylene resins, only rigid ones have been provided. In order to provide soft or semi-rigid propylene resins, there has been no choice but to incorporate rubbery materials or softening agents by complicated and disadvantageous procedures, and moreover the utilization of such propylene resins is limited in many respects. It has been desired therefore to provide soft to semi-rigid propylene resins which can be used in a wide range of applications.

Known soft to semi-rigid resins of the propylene type do not exhibit satisfactory properties because they notably have surface tackiness and poor transparency, and their crystallinity is not sufficiently low, and none have had practical application. Many suggestions have been made heretofore to produce a random copolymer of propylene and 1-butene as a soft to semi-rigid propylene resin, but none have been able to provide copolymers having satisfactory properties.

For example, U.S. Pat. Nos. 2,918,457, 3,278,504 and 3,332,921, and British Pat. Nos. 1018341 and 1084953 disclose the production of low-crystalline random copolymers using titanium trichloride-type catalysts or titanium tetrachloride-type catalysts which are not supported on a solid magnesium compound carrier. All of the copolymers obtained by these patents, however, cannot be made into shaped articles having a high commercial value because they have a wide distribution of composition or molecular weight, a high content of a boiling methyl acetate-soluble portion and surface tackiness. Moreover, these copolymers have a low degree of randomness, a high content of a heptane-insoluble portion and poor transparency.

For example, U.S. Pat. No. 2,918,457 shows a process for producing a propylene/1-butene copolymer having a 1-butene content of 7 to 25% by weight using a titanium trichloride or titanium dichloride catalyst not supported on a carrier. The copolymer obtained is crystalline with a boiling n-heptane-insoluble content of at least 90%, and has a melting point of 150° to 160° C. Moreover, it is rigid, and has poor transparency.

U.S. Pat. No. 3,278,504 discloses a propylene/1-butene copolymer having a 1-butene content of 30 to 70 mole%. The patent states that the copolymer is produced by using an unsupported titanium tetrachloride or titanium trichloride catalyst. However, the copolymer produced with such a catalyst is a resin having a boiling methyl acetate-soluble content of more than 2.0% by weight, a boiling n-heptane-insoluble content of more than 5.0% by weight, tackiness and poor transparency.

U.S. Pat. No. 3,332,921 and British Pat. No. 1084953 disclose various copolymers with different 1-butene contents which are produced by using an unsupported titanium trichloride catalyst. Among these copolymers, those having a 1-butene content of 40 to 90 mole% have unsatisfactory properties as does the copolymer disclosed in U.S. Pat. No. 3,278,504.

According to British Pat. No. 1018341, copolymers having various 1-butene contents are obtained by using a transition metal halide such as titanium trichloride and a derivative of phosphoric acid. The patent discloses a copolymer with a 1-butene content of 40 to 90 mole% which has an acetone-soluble content of at least 2.5% by weight and therefore a higher content of a boiling methyl acetate-soluble portion. The patent states that the copolymers are soluble in various solvents, but a tracing experiment made by the present inventors has shown that these copolymers are only swollen with solvents although they look as if dissolved, and have a very high content of a boiling n-heptane-insoluble portion as measured by the method to be described hereinbelow. The boiling n-heptane-insoluble content of the copolymers obtained by this patent is higher than that of copolymers produced with a catalyst system not containing the phosphoric acid derivative.

On the other hand, Japanese Laid-Open Patent Publication No. 38787/75 discloses a process for obtaining an amorphous random copolymer by polymerization at high temperatures using a titanium trichloride catalyst not supported on a solid magnesium compound. This process can afford a copolymer having a low content of a boiling n-heptane-insoluble portion. However, this copolymer cannot be used as plastics because it has a methyl acetate-soluble content of more than 2.0% and a low tensile strength at break, and its melting point is low or cannot be recognized.

A method is also known to produce an amorphous random copolymer by using a vanadium catalyst. But generally, no melting point can be observed in the copolymer, and its tensile strength is low.

Investigations of the present inventors led to the discovery that a novel random copolymer consisting essentially of 40 to 90 mole% of propylene and 60 to 10 mole% of 1-butene and having the characteristics (A) to (G) described hereinabove which are not found in the conventional propylene/1-butene copolymers.

It has been found that this copolymer has properties typical of rubber and plastics and can be utilized as soft to semi-rigid plastics in a wide range of applications. Specifically, this random copolymer has a low crystallinity as represented by its boiling n-heptane-insoluble content of not more than 5% by weight based on the weight of the copolymer, a narrow distribution of composition as represented by a standard deviation ($\sigma$) of propylene content distribution of not more than 15 mole%, freedom from surface tackiness as represented by its boiling methyl acetate-soluble content of not more than 2% by weight based on the weight of the copolymer, good transparency as represented by its haze (the degree of cloudiness), measured by JIS K6714, of not more than 40%, preferably not more than 30%, and a melting point, determined by differential thermal analysis, of 40° to 140° C. Furthermore, this random copolymer has good properties required of a soft to semi-ringid resin as shown by its intrinsic viscosity, measured in decalin at 135° C., of 0.5 to 6 dl/g, its elongation at break, measured by JIS K6301, of at least 300% and its tensile strength at break of at least 50 kg/cm².

It has also been found that this random copolymer consisting essentially of 40 to 90 mole% of propylene and 60 to 10 mole% of 1-butene and having the characteristics (A) to (G) described hereinabove can be produced by using a catalyst prepared from (1) a solid complex containing magnesium, titanium and halogen, (2) an organometal compound of a metal of Groups I to III of the periodic table and (3) an electron donor. Catalysts of this type have previously been known to be useful for the production of highly crystalline or highly stereoregular polymers or copolymers of olefins, but quite unexpectedly it has been discovered that these catalysts are useful for the production of the low-crystalline random copolymer consisting essentially of propylene and 1-butene and having the characteristics (A) to (G).

It is an object of this invention to provide a random copolymer consisting essentially of propylene and 1-butene having properties distinguished from the conventional copolymers.

Another object of this invention is to provide a process for producing the aforesaid copolymer.

The above and other objects and advantages of this invention will become more apparent from the following description.

The random copolymer of this invention consisting essentially of 40 to 90 mole% of propylene and 60 to 10 mole% of 1-butene has the following characteristics (A) to (G).

(A) It has a boiling n-heptane-insoluble content of not more than 5% by weight, preferably not more than 3% by weight, and more preferably not more than 2% by weight, based on the weight of the copolymer.

The boiling n-heptane-insoluble content is one measure for the randomness and the narrowness of the propyrene content distribution of the copolymer of this invention. The copolymer of this invention has a low content of a boiling n-heptane-insoluble portion, and mainly for this reason, articles prepared from the copolymer of this invention have good transparency.

The boiling n-heptane-insoluble content is determined by the following method.

A mixture of a sample with a size of 1 mm×1 mm×1 mm (X grams) and 1 to 10 times its volume of glass beads (100 to 200 mesh) is placed in a cylindrical glass filter (G3), and the sample is extracted with n-heptane as an extracting solvent under reflux using a Soxhlet extractor. The refluxing frequency is about 1 time/5 minutes. The extracting time is 14 hours.

The insoluble portion is dried (together with the glass filter and glass beads) at 100° to 120° C. and 10 mmHg by a vacuum dryer until its amount became constant. The dried insoluble portion is weighed [X' grams=the total weight (grams) after drying minus the weight (grams) of the glass filter minus the weight (grams) of the glass beads]. The insoluble content (A) is calculated in accordance with the following equation.

$$\text{Insoluble content}(A) = (X'/X) \times 100\ (\%)$$

Alternatively, together with the flask, the soluble portion extracted in the flask was dried by using an evaporator by evaporating off the extracting solvent at 100° to 120° C. under reduced pressure until the amount of the soluble portion became constant. The dried portion was weighed [X" (grams)=the total weight (grams) after drying minus the weight (grams) of the flask]. The insoluble portion is calculated in accordance with the following equation.

$$\text{Insoluble content } (A) = \frac{(X - X'')}{X} \times 100\ (\%)$$

(B) It has a boiling methyl acetate-soluble content of not more than 2% by weight, preferably not more than 1% by weight, based on the weight of the copolymer.

The boiling methyl acetate-soluble content (B) is one measure for the narrowness of the distributions of the propylene content and molecular weight of the copolymer of this invention. The copolymer of this invention has a low content of the boiling methyl acetate-soluble portion, and mainly for this reason, articles obtained from the copolymer of this invention have no surface tackiness.

The boiling methyl acetate-soluble content (B) is determined by the following method.

A sample with a size of about 1 mm×1 mm×1 mm (Y grams) is placed in a cylindrical glass filter (G3), and extracted with methyl acetate as an extracting solvent under reflux by a Soxhlet extractor. The refluxing frequency is about 1 time/5 minutes. The extracting time is 7 hours.

The insoluble portion is dried at about 60° to 80° C. and 10 mmHg by a vacuum dryer until its amount becomes constant. The dried insoluble portion is weighed (Y' grams), and the soluble content (B) is calculated as follows:

$$\text{Soluble content } (B) = \frac{Y - Y'}{Y} \times 100\ (\%)$$

(C) It has a melting point by thermal analysis (the point defined as the peak temperature on the DSC thermogram) of 40° to 140° C.

The presence of a melting point by differential thermal analysis using a differential scanning calorimeter (DSC) in the copolymer of this invention is one of the important features which distinguish the copolymer of this invention from the conventional amorphous copolymers. The heat of fusion of the copolymer of this invention, which is determined by differential thermal analysis using DSC and is a measure for the low crystallinity and low stereo-regularity of the copolymer of this invention, is generally 10 to 80 joules/g, preferably 20 to 70 joules/g.

The melting point (°C.) by DSC thermal analysis is defined as the peak temperature on the DSC thermogram. The heat of fusion by DSC thermal analysis is determined by extrapolating the specific heat curve (preferably the specific heat curve at 160° to 240° C.) of the copolymer in the completely molten state to a straight line on the low temperature side, and calculating the area surrounded by the specific heat curve and the resulting straight line, in accordance with the method described in Benjamin Carroll "Physical Methods in Macromolecular Chemistry," Volume 2, Chapter 4, Marcel Dekker, Inc., New York, 1972.

Because the copolymer of this invention has a high degree of randomness and a narrow distribution of composition and molecular weight, it tends to show a lower melting point than the conventional copolymers when the propylene content is the same. Furthermore, the copolymer of this invention is characterized by the fact that the peak temperature on the thermogram in DSC thermal analysis appears more sharply than in the case of the conventional copolymers. A diffraction pattern of crystals can be observed in the copolymer of this invention by X-ray diffraction.

(D) It has an intrinsic viscosity, measured at 135° C. in decalin, of 0.5 to 6 dl/g, preferably 1 to 5 dl/g.

The intrinsic viscosity (D) specified in this invention shows that shaped articles made from the copolymer of this invention have sufficient molecular weights for exhibiting useful properties for practical application. The determination of intrinsic viscosity is well known, and in the present invention, the intrinsic viscosity of the copolymer is determined by a known method using decalin at 135° C.

(E) It has an elongation at break, as measured by JIS K6301, of at least 300%, preferably at least 400%, more preferably 450 to 1,000%.

(F) It has a tensile strength at break, as measured by JIS K6301, of at least 50 kg/cm², preferably 100 to 500 kg/cm², more preferably 130 to 350 kg/cm².

The elongation at break (E) and the tensile strength at break (F) of the copolymer of this invention show that shaped articles prepared from the copolymer of the invention have useful properties for practical application.

These properties are measured in accordance with JIS K6301 using ring-shaped test pieces with an inside diameter of 18 mm and an outside diameter of 22 mm which is punched out from a press sheet with a thickness of 1 mm formed in accordance with JIS K6758. The measurement is made in atmospheric air at 25° C. at a pulling speed of 500 mm/min.

(G) It has a haze (the degree of cloudiness), as measured by JIS K6714, of not more than 40%, preferably not more than 30%.

The haze (G) is a measure for the superior transparency of the copolymer of this invention. It is measured in accordance with JIS K6714 using a 1 mm thick press sheet formed in accordance with JIS K6758.

Preferably, the random copolymer of this invention additionally has the following characteristics (H) to (J).

(H) The melting point Tm of the copolymer of this invention is in the range of 40° to 140° C. and also satisfies the following expression:

$$1.4|y| - 16 \leq |Tm| \leq 1.4|y| + 30$$

wherein y is the content in mole % of propylene.

In many cases, the melting point of the copolymer of this invention satisfies the following expression:

$$1.4|y| - 11 \leq |Tm| \leq 1.4|y| + 24$$

(I) The standard deviation ($\sigma$) of the distribution of the propylene content of the copolymer of this invention is not more than 15 mole%. The standard deviation is a measure for the narrowness of the propylene content distribution of the copolymer of this invention, and is not more than 15 mole%, preferably not more than 10 mole%.

The distribution of the composition is determined by an elution fractionation method using a column by changing the eluting temperature stepwise (at intervals of 5° C.) from 10° C. to 130° C. using p-xylene as a solvent. At this time, a fraction at each temperature is eluted for 4 hours using 2 liters of p-xylene for 10 g of the sample, and then the sample is fractionated into more than ten fractions. The standard deviation ($\sigma$) is defined by the following equation.

$$\sigma = [\int_0^{100} (\bar{X} - X)^2 f(x) dx]^{\frac{1}{2}}$$

wherein $\bar{X}$ is the average content (mole%) of propylene in the copolymer, X is the content (mole%) of propylene, and f(x) is the differential distribution function of weight for a component with a content of X (mole%).

(J) It has a C hardness, measured by JIS K6301, of 40 to 98. The C hardness is measured in accordance with JIS K6301 using a 3 mm thick sheet formed in accordance with JIS K6758.

Of random copolymers of this invention consisting essentially of 40 to 90 mole% of propylene and 60 to 10 mole% of 1-butene, those having a propylene content of 60 to 85 mole% and a 1-butene content of 40 to 15 mole% are preferred because they have a moderate degree of softness, relatively high melting points and good transparency and do not have any crystalline modification at temperatures of use. If the propylene content of the random copolymer of this invention exceeds 90 mole%, its transparency is reduced, and copolymerization cannot be performed in a homogeneous solution. If the propylene content is less than 40 mole%, the crystalline modification of the resulting copolymer based on 1-butene becomes remarkable, and its properties greatly change with time.

According to the present invention, there is provided a process for producing a random copolymer consisting essentially of 40 to 90 mole% of propylene and 60 to 10 mole% of 1-butene, and having (A) a boiling n-heptane-insoluble content of not more than 5% by weight based on the weight of the copolymer, (B) a boiling methyl acetate-soluble content of not more than 2% by weight based on the weight of the copolymer, (C) a melting point by differential thermal analysis of 40° to 140° C., (D) an intrinsic viscosity, measured in decalin at 135° C., of 0.5 to 6 dl/g, (E) an elongation at break, measured by JIS K6301, of at least 300%, (F) a tensile strength at break, measured by JIS K6301, of at least 50 kg/cm$^2$, and (G) a haze, measured by JIS K6714, of not more tan 40%, which comprises copolymerizing propylene and 1-butene in the presence of a catalyst prepared from (1) a solid complex containing magnesium, titanium and halogen, (2) an organometal compound of a metal of Groups I to III of the periodic table, and (3) an electron donor.

A part or the whole of the electron donor (3) may by supported on a part or the whole of the solid complex (1). Or prior to use, it may be mixed with the organometal compound in advance. In an especially preferred embodiment, a part of the electron donor is supported on the solid complex (1), and the remainder is added to the polymerization system either as such or after it has been mixed beforehand with the organometal compound (2). The use of such a catalyst system can afford a random copolymer having a lower content of a methyl acetate-soluble portion. At this time, the electron donor supported on the solid complex (1) may be the same as or different from the electron donor used as such in the polymerization system or after it has been mixed with the organometal compound (2).

The solid complex (1) containing magnesium, titanium and halogen is obtained by intimately mixing a magnesium compound and a titanium compound, at least one of which contains halogen, with each other by such means as heating or copulverization. Preferably, it is a solid complex in which the halogen/titanium mole ratio exceeds about 4, and the titanium compound is not substantially liberated by washing with an inert solvent at room temperature. The chemical structure of the complex is not known, but it is assumed that the magnesium atom and the titanium atom are bonded firmly to each other by, for example, having the halogen in common. Depending upon the method of production, this complex solid may contain other metal atoms such as aluminum or silicon, an electron donor, or an organic group ascribable to the electron donor. It may also contain an organic or inorganic inert diluent, such as LiCl, $CaCO_3$, $BaCl_2$, $Na_2CO_3$, $SrCl_2$, $B_2O_3$, $Na_2SO_4$, $Al_2O_3$, $SiO_2$, $TiO_2$, $NaB_4O_7$, $Ca_3(PO_4)_2$, $CaSO_4$, $Al_2(SO_4)_3$, $CaCl_2$, $ZnCl_2$, polyethylene, polypropylene, or polystyrene. A complex containing an electron donor, preferably an organic acid ester or ether, is suitable.

Suitable solid complexes (1) have a halogen/titanium mole ratio of more than about 4, preferably at least about 5, more preferably about 8 to 100, a magnesium/titanium mole ratio of at least about 3, preferably about 5 to about 50, an electron donor/titanium mole ratio of about 0.2 to about 6, preferably about 0.4 to about 3, more preferably about 0.8 to about 2, and a specific surface area of at least about 3 m$^2$/g, preferably at least about 40 m$^2$/g, more preferably about 100 to 800 m$^2$/g.

It is desirable that irrespective of the starting magnesium compound, the X-ray spectrum of the solid complex (1) should show amorphism, or should be in the state rendered very amorphous as compared with ordinary commercially available grades of magnesium dihalide.

The solid complex (1) can be produced by various known methods such as those disclosed in Japanese Patent Publications Nos. 36786/77 (published on Sept. 17, 1977), and 36913/77 (published on Sept. 17, 1977), Japanese Laid-Open Patent Publications Nos. 126590/75 (published on Oct. 4, 1975), 28189/76 (published on Mar. 9, 1976), 92885/76 (published on Aug. 14, 1976), 127185/76 (published on Nov. 5, 1976), 136625/76 (published on Nov. 26, 1976), and 87489/77 (published on July 21, 1977), and West German Laid-Open Patents Nos. 2643143 (published on June 2, 1977), 2656055 (published on June 23, 1977) and 2708588 (published on Sept. 8, 1977).

A typical method for producing the solid complex (1) is a method which comprises contacting at least a magnesium compound or metallic magnesium, an electron donor and a titanium compound.

Such an electron donor may be the same as the electron donor (3). Examples of the electron donor (3) are oxygen-containing electron donors such as alcohols, phenols, ketones, aldehydes, carboxylic acids, esters, ethers, acid amides and acid anhydrides, and nitrogen-containing electron donors such as amines, nitriles and isocyanates. Specific examples are alcohols with 1 to 18 carbon atoms such as methanol, ethanol, propanol, pentanol, hexanol, octanol, dodecanol, octadecyl, alcohol, benzyl alcohol, phenylethyl alcohol, cumyl alcohol, and isopropylbenzyl alcohol; phenols with 6 to 15 carbon atoms optionally containing lower alkyl, such as phenol, cresol, xylenol, ethyl phenol, propyl phenol, cumyl phenol, and naphthol; ketones with 3 to 15 carbon atoms such as acetone, methyl ethyl ketone, methyl isobutyl ketone, acetophenone and benzophenone; aldehydes with 2 to 15 carbon atoms such as acetaldehyde, propionaldehyde, octylaldehyde, benzaldehyde, tolualdehyde and naphthaldehyde; organic acid esters with 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarine, phthalide and ethylene carbonate; halides with 2 to 15 carbon atoms such as acetyl chloride, benzyl chloride, tolyl chloride and anisoyl chloride; ethers with 2 to 20 carbon atoms such as methyl ether, ethyl ether, isopropyl ether, butyl ether, amyl ether, tetrahydrofuran, anisole and diphenyl ether; acid amides such as acetamide, benzamide and toluamide; amines such as methylamine, ethylamine, diethylamine, tributylamine, piperidine, tribenzylamine, aniline, pyridine, picoline and tetramethyl ethylenediamine; nitriles such as acetonitrile, benzonitrile and tolunitrile; and aluminum and silicon compounds containing in the molecule functional groups derived from these. These electron donors can be used singly or as mixtures of two or more.

Suitable magnesium compounds used to prepare the solid complex (1) are compounds containing halogen and/or an organic group. Specific examples include the dihalides, alkoxy halides, aryloxy halides, hydroxy halides, dialkoxides, diaryloxides, alkoxy aryloxides, acyloxy halides, alkyl halides, aryl halides, dialkyl compounds, diaryl compounds, and alkyl alkoxides of magnesium. The magnesium compound may be in the form of an adduct with the electron donor. Or it may be a complex compound containing another metal such as aluminum or silicon.

Various methods for producing the magnesium compounds have been known, and the magnesium compounds used in this invention may be those which are produced by any of these methods. Prior to use, the magnesium compound may be pre-treated. For example, the pretreatment is carried out by dissolving the magnesium compound in ether or acetone either alone or together with another metal compound and evaporating the solvent, or pouring it into an inert solvent to separate the solid. Or at least one magnesium compound with or without another metal compound is mechanically pulverized.

Preferred magnesium compounds are the dihalides, aryloxy halides and aryloxides of magnesium, and complex compounds of these with aluminum or silicon. Specific examples are $MgCl_2$, $MgBr_2$, $MgI_2$, $MgF_2$, $MgCl(OC_6H_5)$, $Mg(OC_6H_5)_2$, $MgCl(OC_6H_4-2-CH_3)$, $Mg(OC_6H_4-2-CH_3)_2$, $(MgCl_2)_x \cdot [Al(OR)_nCl_{3-n}]_y$, and $(MgCl_2)_x[Si(OR)_mCl_{4-m}]_y$ (wherein R is a hydrocarbon group such as an alkyl or aryl group, and the m-R's or n-R's may be identical or different, $0 \leq n \leq 3$, $0 \leq m \leq 4$, and x and y are positive numbers). $MgCl_2$ and its complexes are especially preferred.

The titanium compound to be used in the preparation of the solid complex (1) is a tetravalent titanium compound of the formula $Ti(OR)_gCl_{4-g}$ wherein R is a hydrocarbon group such as a $C_1$-$C_{20}$ alkyl group, cycloalkyl group or aryl group, and g represents 0 or 1. Examples of such a titanium compounds are $TiCl_4$, and trichloroalkoxy titaniums such as $Ti(OCH_3)Cl_3$, $Ti(OC_2H_5)Cl_3$ and $Ti(O\ n\text{-}C_4H_9)$. The use of $TiCl_4$ is most preferred.

There are various embodiments of forming the solid complex (1) by reacting the magnesium compound (or metallic magnesium), the electron donor and the titanium compound. Typical embodiments are given below.

[I] Method which comprises reacting the magnesium compound with the electron donor, and then reacting the reaction product with the titanium compound:

(I-a) Method [I] which involves the mechanical copulverization of the magnesium compound and the electron donor.

The electron donor added at the time of copulverization needs not to be in the free state, and may be present in the form of an adduct with the magnesium compound. At the time of copulverisation, the aforesaid organic or inorganic inert diluent, a halogenating agent such as a halogen compound of silicon, another silicon compound such as polysiloxane, an aluminum compound, and a part of the titanium compound may optionally be present. At this time, the electron donor may be in the form of an adduct (complex) with such a compound.

The amount of the electron donor is preferably about 0.005 to about 10 moles, more preferably about 0.01 to 1 mole, per mole of the magnesium compound. The mechanical copulverization can be performed by using such a device as a rotary ball mill, a vibratory ball mill or an impact mill. Taking up a rotary ball mill as an example, copulverization is desirably carried out such that 100 stainless steel (SUS 32) balls with a diameter of 15 mm are accommodated in a stainless steel (SUS 32) ball mill cylinder with a capacity of 800 ml and an inside diameter of 100 mm, and 20 to 40 g of the materials are pulverized in the ball mill cylinder at a rotating speed of 125 rpm for a period of at least 24 hours, preferably at least 48 hours. The temperature used for pulverization treatment is usually from room temperature to about 100° C.

The reaction of the mechanically copulverized product with the titanium compound may also be performed by a copulverizing technique. However, it is preferred to employ a method in which the copulverized product is suspended in a liquid titanium compound in an amount of at least about 0.05 mole, preferably about 0.1 to about 50 moles, per mole of the magnesium compound with or without an inert solvent such as hexane, heptane or kerosene. The suitable reaction temperature is from room temperature to about 200° C., and the reaction time is from 5 minutes to about 5 hours. If desired, the reaction can be performed under conditions outside the specified ranges. After the reaction, the resulting product is preferably separated by hot filtration at a high temperature of, say, about 60 to about 150° C., and is then well washed with the inert solvent described above, before it is used in polymerization.

(I-b) Method [I] which does not involve the mechanical copulverization of the magnesium compound and the electron donor.

Usually, an embodiment can be employed in which the magnesium compound and the electron donor are reacted in the inert solvent described above, or the magnesium compound is dissolved or suspended in the electron donor in liquid form. Of course, it is possible to employ an embodiment in which magnesium metal is used as a starting material and reacted with the electron donor while forming a magnesium compound.

The amount of the electron donor used is about 0.01 to about 10 moles, preferably about 0.05 to about 6 moles, per mole of the magnesium compound. It is sufficient that the reaction is performed at room temperature to about 200° C. for 5 minutes to about 5 hours. After the reaction, the reaction product can be separated by filtration or evaporation followed by washing with the aforesaid inert solvent.

The reaction of the resulting reaction product with the titanium compound can be performed in the same way as described in (I-a) above.

(I-c) Method [I] which comprises reacting the reaction product between the magnesium compound and the electron donor with an organoaluminum compound, and then reacting the reaction product with the titanium compound.

This method is a special embodiment of the method (I-b). Generally, the complex obtained by the method (I-a) has high performance. Some of the complexes obtained by the method (I-b) are inferior in performance to those obtained by method (I-a). The employment of this method in which reaction with an organoaluminum compound is performed before the reaction with the titanium compound is very effective for these inferior products.

The organoaluminum compound used in this method includes, for example, trialkyl aluminums, dialkyl aluminum hydrides, dialkyl aluminum halides, alkyl aluminum sesquihalides, alkyl aluminum dihalides, dialkyl aluminum alkoxides, dialkyl aluminum phenoxides, alkyl aluminum alkoxyhalides, alkyl aluminum phenoxyhalides, and mixtures of these. Specific examples are triethyl aluminum, triisobutyl aluminum, diethyl aluminum chlorides, diisobutyl aluminum bromide, ethyl aluminum sesquichloride, diethyl aluminum ethoxide, ethyl aluminum ethoxy chloride, ethyl aluminum dichloride, and butyl aluminum dichloride.

The reaction of the magnesium compound-electron donor reaction product with the organoaluminum compound may be carried out in an inert solvent of the types described hereinabove. The organoaluminum compound is used in an amount of about 0.1 to about 20 moles, preferably about 0.5 to about 10 moles, per mole of the magnesium compound. The reaction is preferably carried out at room temperature to about 100° C. for about 5 minutes to about 5 hours. After the reaction, the product is preferably well washed with the inert solvent, and then reacted with the titanium compound. The reaction of the product with the titanium compound can be performed in the same way as described in (I-a).

Numerous modifications of the aforesaid methods are possible by, for example, changing the order of adding the reactants, performing a particular reaction two or more times, or using additional reagents. Whichever method may be employed, it is desirable that the proportions of halogen, titanium, magnesium and the electron donor in the resulting solid complex (1), and its surface area and X-ray spectrum should be as specified hereinabove. The electron donor desirably contained in the complex (1) is a compound not containing active hydrogen, such as an ester, ether, ketone, tertiary amine, acid halide or acid anhydride. Preferred electron donors are organic acid esters or ethers, and of these, aromatic carboxylic acid esters and alkylcontaining ethers are especially preferred. Typical examples of suitable aromatic carboxylic acid esters are lower alkyl esters of benzoic acid, lower-alkylbenzoic acids, and lower-alkoxybenzoic acids. The term "lower" is used to show that compounds or groups modified by it contain 1 to 4 carbon atoms, preferably 1 to 2 carbon atoms. Suitable alkyl-containing ethers are those containing 4 to 20 carbon atoms such as diethyl ether or dibutyl ether.

The process of this invention uses a catalyst prepared from the solid complex (1) containing magnesium, titanium and halogen formed by any of the various embodiments shown above, the organometal compound (2) of a metal of Groups I to III of the periodic table, especially a compound selected from alkyl aluminums and alkyl aluminum halides, and (3) the electron donor.

The organometal compound (2) is a compound having a hydrocarbon group directly bonded to a metal, preferably an alkyl aluminum and an alkyl aluminum halide. Examples of suitable organometal compounds are trialkyl aluminum compounds with the alkyl group containing 1 to 12 carbon atoms such as $Al(CH_3)_3$, $Al(C_2H_5)_3$, $Al(C_3H_7)_3$, $Al(C_4H_9)_3$ and $Al(C_{12}H_{25})_3$; and dialkyl aluminum halides with the alkyl group containing 1 to 6 carbon atoms such as $(C_2H_5)_2AlCl$, $(C_2H_5)_2AlI$ and $(C_4H_9)_2AlCl$.

Generally, when a catalyst system prepared by using a halogen-free alkyl aluminum compound such as a trialkyl aluminum as an organometal compound (2) is utilized, the amount yielded of the polymer per unit weight of catalyst is very great, and at times, the polymer can be used without removing ash. Of course, the removal of ash can be performed by contacting with reagents usually employed in post-treatment in Ziegler polymerizations, such as alcohols, water or carboxylic acids.

The electron donor (3) may be those electron donors exemplified hereinabove for use in the preparation of the solid complex (1). Usually, compounds not containing active hydrogen, such as esters, ethers, ketones, and tertiary amines, are preferred. The electron donor may be supported partly or wholly on the solid complex (1). According to a preferred embodiment, a part of the electron donor is supported on the solid (1), and the remainder is added to the reaction system either as such or after it has been mixed with the organometal compound (2). In this case, the properties of the resulting copolymer differ somewhat according to the type of the electron donor used. For example, when an ester is used as the electron donor to be added to the polymerization system with or without premixing with the organometal compound (2), a random copolymer having a relatively high hardness and a high tensile strength tends to be formed. The use of an ether, on the other hand, tends to afford a random copolymer which is softer and has better transparency even when the propylene content is the same.

According to the present invention, propylene and 1-butene is copolymerized in the presence of the catalyst prepared in the manner described hereinabove to form a random copolymer consisting essentially of 40 to 90 mole% of propylene and 60 to 10 mole% of 1-butene having the characteristics (A) to (G).

Copolymerization of propylene and 1-butene can be performed either in the liquid phase or in the gaseous phase. Preferably, it is carried out in the liquid phase under conditions such that the resulting copolymer dissolves in it. The liquid-phase copolymerization can also be performed in an inert solvent, for example an aliphatic hydrocarbon such as hexane, heptane or kerosene, an alicyclic hydrocarbon such as cyclohexane, or an aromatic hydrocarbon such as benzene, toluene or xylene. Alternatively, the olefin itself may be used as a reaction medium.

In the case of the liquid-phase copolymerization, the concentration of the solid complex (1) in the polymerization system is preferably 0.001 to 0.5 millimole as titanium atom per liter of liquid phase, and the concentration of the organometal compound (2) is preferably 0.1 to 50 millimoles as metal atom per liter of liquid phase. The amount of the organometal compound (2) is chosen such that the ratio of the metal atom to the titanium atom of component (1) becomes 1:1 to 1000:1, preferably 1:1 to 200:1. The amount of the electron donor (3) is 0.001 to 1 mole, preferably 0.01 to 0.9 mole, per metal atom of the organometal compound.

The copolymerization in accordance with this invention can be performed in the same way as in a polymerization of an olefin with an ordinary Ziegler catalyst. The copolymerization temperature is usually 30° to 140° C., preferably 50° to 120° C. Preferably, the polymerization is carried out under an elevated pressure, usually from atmospheric pressure to 50 kg/cm², preferably about 2 to 20 kg/cm². The ratio of propylene to 1-butene to produce copolymers having a propylene content of 40 to 90 mole%, which differs according to the polymerization pressure, is usually 85:15 to 10:90.

The molecular weight of the copolymer can be controlled to some extent by varying the polymerization conditions such as the polymerization temperature and the proportions of the catalyst ingredients. The addition of hydrogen to the polymerization system is most effective.

The random copolymer of this invention is free from surface tackiness and has good transparency and the various other characteristics described hereinabove, and in this regard, differs from the conventional propylene/1-butene copolymers.

The random copolymer of this invention can be formed into various useful shaped articles such as films, sheets and hollow vessels by various shaping methods such as extrusion molding, blow molding, injection molding, press forming or vacuum forming. The copolymer has especially good transparency, antiblocking property, heat-sealability and suppleness. It also has superior adaptability to the formation of biaxially oriented films having excellent shrinkability at low temperatures, embossing, the formation of foamed sheets, and to the formation of strippable films or coatings. By virtue of these properties, the copolymer of this invention finds a wide range of application as films or sheets, for example packaging films; packaging shrinkable films; strippable films; and artificial leather, sheet materials or foamed sheets suitable for application to automobiles, aircraft, furniture, footwear, wearing apparel or bags. These articles may, for example, be in the form of foamed or unfoamed films laminated with various backing materials.

Various additives used customarily in plastics fabrication can be utilized in the formation of shaped articles from the random copolymer of this invention. These additives are, for example, stabilizers, ultraviolet absorbers, antistatic agents, lubricants, plasticizers, pigments, and inorganic or organic fillers.

Specific examples of these additives include stabilizers such as 2,6-di-tert-butyl-p-cresol, tetrakis [methylene-3-(3,5-di-tert.-butyl-4-hydroxyphenyl)propionate]methane, 4,4'-butylidenebis(6-tert-butyl-m-cresol), tocopherols, ascorbic acids, dilauryl thiodipropionate, phosphoric acid-type stabilizing compounds, fatty acid monoglycerides, N,N-(bis-2-hydroxyethyl)alkylamine, 2-(2'-hydroxy-3',5'-di-tert-butylphenyl)-5-chlorobenzotriazole, and calcium stearate; ultraviolet absorbers such as 2-hydroxy-4-n-octyl benzophenone, 4-dodecyloxy-2-hydroxybenzophenone, 2-(2'-hydroxy-3',5'-ditert.-butyl phenyl)benzotriazole, 2-(2'-hydroxy-3'-tert-butyl-5'-methyl phenyl)benzotriazole, p-octyl-phenyl salicylate, carboxyphenyl salicylate, dodecyl salicylate, 2-ethyl-hexyl-2-cyano-3,3-diphenyl acrylate, resorcinol monobenzoate, and [2,2'-thiobis(4-tert-octyl phenolate)]n-butylamine nickel; antistatic agents such as sorbitan fatty acid monoesters, pentaerythritol fatty acid esters, polyethylene glycol, polyethylene glycol monoethers, polyethylene glycol fatty acid monoesters, betaine derivatives, hydroxyethyl imidazoline sulfuric acid ester, fatty acid salts, sulfuric acid ester salts of higher fatty acid oils and aliphatic amines; lubricants such as liquid paraffin, natural paraffin, microwax, synthetic paraffins, polyethylene wax, stearic acid, lauric acid, stearamide, palmitamide, methylenebis stearamide, ethylenebis stearamide, oleinamide, cetylamide, hardened castor oil, butyl stearate, ethylene glycol monostearate, cetyl alcohol, stearyl alcohol and metal soaps; pigments such as cadmium orange, red iron oxide, cadmium red, cadmium yellow, quinacridone red, ultramarine, cobalt blue, phthalocyanine blue, phthalocyanine green, chrome green, aluminum powder, titanium oxide, zinc oxide and carbon black; and organic or inorganic fillers such as magnesium oxide, magnesium hydroxide, alumina, aluminun hydroxide, silica, hydrotalcite, talc, clay, gypsum, glass fibers, titania, calcium carbonate, carbon black, petroleum resins, polybutene, waxes, and synthetic or natural rubbers.

The amounts of these additives can be chosen properly, and are, for example about 0.01 to about 5% by weight for the stabilizers; about 0.01 to about 1% by weight for the ultraviolet absorbers; about 0.01 to about 10% by weight for the antistatic agents; about 0.05 to about 5% by weight for the lubricants; about 0.05 to about 10% by weight for the pigments; and up to about 150% by weight for the inorganic or organic fillers, all based on the weight of the copolymer or the total weight of the copolymer and the other resin.

Examples of other resins which are used as blended with the random copolymer of this invention are various thermoplastic resins such as high density, medium density and low density polyethylenes, polypropylene, poly-1-butene, poly-4-methyl-1-pentene, an ethylene/vinyl acetate copolymer, ionomer, an ethylene/vinyl alcohol copolymer, polystyrene, and maleic anhydride-grafted products of these polymers.

The following examples illustrate the present invention in more detail.

EXAMPLE 1

Catalyst Preparation

Anhydrous magnesium chloride (20 g), 4.6 ml of ethyl benzoate and 3.0 ml of methyl polysiloxane (viscosity 20 centispokes at 25° C.) were charged in an atmosphere of nitrogen into a stainless steel (SUS-32) ball mill cylinder with an inner capacity of 800 ml of inside diameter of 100 mm having accommodated therein 2.8 kg of stainless steel (SUS-32) balls with a diameter of 15 mm. These materials were contacted for 100 hours at an impact acceleration of 7.8 G. Ten grams of the resulting solid product was suspended in 100 ml of titanium tetrachloride, and contacted at 80° C. for 2 hours with stirring. The solid was collected by filtration, and washed with purified hexane until no free titanium tetrachloride was detected in the wash liquid. The washed solid was dried to afford a titanium-containing solid catalyst complex (1) which contained 2.0% by weight of titanium, 66.0% by weight of chlorine and 6.5% by weight of ethyl benzoate and had a surface area of 200 m$^2$/g.

Polymerization

Propylene and 1-butene were copolymerized continuously in a 2-liter glass polymerization reactor equipped with stirring vanes. From the top portion of the reactor, toluene was continuously fed as a polymerization solvent at a rate of 4 liters/hour. In the meantime, the polymerization mixture was continuously withdrawn from the bottom of the polymerization reactor so that the amount of the polymerization mixture in the reactor was always maintained at 1 liter.

As a catalyst, the solid complex (1), triethyl aluminum (2), and methyl p-toluate (3) were continuously fed into the polymerization reactor from its top so that the concentrations of these ingredients in the reactor were maintained at 0.01 millimole/liter (as titanium), 1.0 millimole/liter, and 0.33 millimole/liter, respectively. Furthermore, from the top of the reactor, a gaseous mixture consisting of 65 mole% of propylene and 35 mole% of 1-butene was fed continuously at a rate of 400 liters/hour. The copolymerization was performed at 70° C. by circulating hot water through a jacket fitted externally of the reactor.

The copolymerization under the aforesaid conditions gave a propylene/1-butene copolymer in the form of a uniform solution. Methanol was added to the polymer solution withdrawn from the bottom of the polymerization reactor to stop the polymerization. The catalyst residue was removed by hot water containing small amounts of hydrochloric acid and methanol, and then the polymer solution was poured into a large amount of methanol to precipitate the polymer. The polymer precipitated was washed with methanol, and dried at 100° C. under reduced pressure for one day.

The aforesaid procedure gave a propylene/1-butene copolymer at a rate of 141 g/hour. The resulting copolymer had a propylene content, as measured by NMR spectroscopy, of 66.5 mole%, a standard deviation of propylene content, as measured by an elution fractionation method, of 3.6 mole%, a melting point, as measured by DSC analysis, of 99° C., a heat of fusion, as measured by DSC analysis, of 54 joules/g, an intrinsic viscosity, as measured in decalin at 135° C., of 1.67 dl/g, a boiling n-heptane-insoluble content of 0.1%, and a boiling methyl acetate-soluble content of 0.3%. The copolymer also had a tensile strength at break, measured by JIS K6301, of 208 kg/cm$^2$ and an elongation at break, measured by JIS K6301, of 710%, and a JIS C hardness of 81.

A 1 mm thick sheet fabricated from the resulting copolymer in accordance with JIS K6758 had a haze, as measured by JIS K6714, of 10% and thus had good transparency. Its surface was free from tackiness.

EXAMPLE 2

The same procedure as in Example 1 was repeated except that as a catalyst, the solid complex (1) prepared in Example 1, diethylaluminum chloride (2), and methyl p-toluate (3) were fed so that the concentrations of these ingredients in the polymerization reactor were maintained at 0.1 millimol/liter (as titanium), 1.0 millimole/liter, and 0.33 millimole/liter, respectively. As a result, a copolymer was obtained at a rate of 22 g/hour.

The copolymer had a propylene content of 68.2 mole%, a standard deviation of propylene content of 6.1 mole%, a melting point of 104° C., a heat of fusion of 52 joules/g, an intrinsic viscosity of 1.67 dl/g, a boiling n-heptane-insoluble content of 0.4%, a boiling methyl acetate-soluble content of 0.5%, a tensile strength at break of 208 kg/cm$^2$, an elongation at break of 710%, a JIS C hardness of 81, and a haze of 11%. A press sheet formed from the copolymer had no surface tackiness.

EXAMPLE 3

The same procedure as in Example 1 was repeated except that n-heptane was used as a polymerization solvent instead of toluene. A copolymer was obtained at a rate of 80 g/hour.

The resulting copolymer had a propylene content of 72.1 mole%, a standard deviation of propylene content of 7.3 mole%, a melting point of 103° C., a heat of fusion of 56 joules/g, an intrinsic viscosity of 1.83 dl/g, a boiling n-heptane-insoluble content of 0.8%, a boiling methyl acetate-soluble content of 0.5%, a tensile strength at break of 210 kg/cm$^2$, an elongation at break of 690%, a JIS C hardness of 83 and a haze of 12%. A press sheet fabricated from the resulting copolymer had no surface tackiness.

EXAMPLE 4

This Example shows batchwise polymerization under elevated pressures using hexane as a polymerization solvent.

A 2-liter stainless steel autoclave equipped with stirring vanes was purged with nitrogen, and then charged with 450 ml of hexane, 3 moles of propylene, 3 moles of 1-butene, 2.0 millimoles of triethyl aluminum (2), and 0.67 millimole of methyl p-toluate (3). The autoclave was heated to 80° C., and the solid complex (1) prepared in Example 1 was fed into the autoclave so that the amount of titanium became 0.03 millimole. The polymerization reaction was started, and performed at 80° C. for 1 hour at an initial polymerization pressure of 17 kg/cm$^2$.G. A small amount of methanol was introduced into the autoclave to stop the polymerization, and the unreacted monomers were driven off. The polymer solution obtained was treated in the same way as in Example 1 to afford 50 g of a copolymer of propylene and 1-butene.

The copolymer had a propylene content of 75.4 mole%, a standard deviation of propylene content of 8.4 mole%, a melting point of 104° C., a heat of fusion of 58 joules/g, an intrinsic viscosity of 2.74 dl/g, a boiling n-heptane-insoluble content of 0.7%, a boiling methyl acetate-soluble content of 0.2%, a tensile strength at break of 236 kg/cm$^2$, an elongation at break of 680%, a JIS C hardness of 86, and a haze of 15%. A press sheet fabricated from the copolymer had no surface tackiness.

EXAMPLE 5

This Example shows batchwise polymerization under elevated pressures in a monomer solvent using hydrogen as a molecular weight controller.

A 6-liter stainless steel autoclave equipped with stirring vanes was purged with nitrogen, and then charged with 13.3 moles of propylene, 13.3 moles of 1-butene, 6 liters (NTP) of hydrogen, 5 millimoles of triethyl aluminum (2) and 1 millimole of methyl p-toluate (3). The autoclave was heated to 80° C., and then the solid complex (1) prepared in Example 1 was added so that the concentration of titanium became 0.015 millimole, and the polymerization was started. The polymerization was performed for 1 hour at 80° C. under an initial polymerization pressure of 20 kg/cm$^2$.G. A small amount of methanol was initroduced into the autoclave to stop the polymerization reaction. The unreacted monomers were driven off to afford 235 g of a copolymer.

The copolymer had a propylene content of 87.3 mole%, a standard deviation of propylene content of 9.2 mole%, a melting point of 126° C., a heat of fusion of 67 joules/g, an intrinsic viscosity of 2.50 dl/g, a boiling n-heptane-insoluble content of 1.3% and a boiling methyl acetate-soluble content of 0.3%, a tensile strength at break of 246 kg/cm$^2$, an elongation at break of 680%, a JIS C hardness of 93, and a haze of 16%. A press sheet fabricated from the copolymer had no surface tackiness.

EXAMPLES 6 TO 52

The same procedure as in Example 1 was repeated except that each of the electron donor compounds shown in Table 1 was used instead of the methyl p-toluate. The results are shown in Table 1.

Table 1

| Ex. | Electron donor Compound | Amount (m-moles/l) | Yield of polymer (g/hr) | Propylene content (mole %) | Standard deviation (mole %) | Melting point (°C.) | Heat of fusion (joules/g) | Intrinsic viscosity (dl/g) | n-Heptane-insoluble content (wt. %) | Methyl acetate-soluble content (wt. %) | Tensile strength at break (%) | Elongation at break (%) | Hardness (JISC) | Haze (%) |
|---|---|---|---|---|---|---|---|---|---|---|---|---|---|---|
| 6 | Ethyl benzoate | 0.33 | 128 | 70.9 | 5.2 | 100 | 49 | 1.58 | 0.2 | 0.5 | 200 | 730 | 77 | 9 |
| 7 | Methyl benzoate | " | 96 | 73.2 | 4.9 | 102 | 51 | 1.73 | 0.3 | 0.5 | 190 | 750 | 78 | 9 |
| 8 | Phenyl benzoate | " | 81 | 76.9 | 6.8 | 110 | 53 | 1.86 | 0.3 | 0.7 | 203 | 710 | 79 | 10 |
| 9 | Coumarine | " | 85 | 75.4 | 6.1 | 108 | 52 | 1.81 | 0.2 | 0.7 | 196 | 730 | 78 | 10 |
| 10 | Methyl formate | " | 73 | 77.6 | 6.9 | 115 | 54 | 1.93 | 0.4 | 0.8 | 215 | 700 | 79 | 11 |
| 11 | Ethyl acetate | " | 78 | 77.3 | 6.0 | 114 | 53 | 1.88 | 0.3 | 0.6 | 211 | 710 | 79 | 10 |
| 12 | Ethyl valerate | " | 86 | 75.5 | 5.7 | 110 | 50 | 1.80 | 0.3 | 0.7 | 208 | 710 | 78 | 10 |
| 13 | Methyl ether | 1.0 | 152 | 65.9 | 6.8 | 98 | 22 | 1.51 | 0.1 | 0.4 | 105 | 880 | 45 | 2 |
| 14 | i-Amyl ether | " | 160 | 66.3 | 7.0 | 96 | 20 | 1.49 | 0.2 | 0.4 | 107 | 850 | 43 | 3 |
| 15 | Diphenyl ether | " | 135 | 69.1 | 7.2 | 98 | 25 | 1.73 | 0.1 | 0.5 | 115 | 820 | 47 | 3 |
| 16 | Tetrahydrofuran | " | 101 | 72.8 | 7.3 | 102 | 26 | 1.90 | 0.3 | 0.7 | 120 | 800 | 48 | 6 |
| 17 | Ethanol | 0.9 | 210 | 56.6 | 7.4 | 93 | 27 | 1.24 | 0 | 0.9 | 135 | 890 | 52 | 5 |
| 18 | t-Butanol | " | 208 | 56.3 | 6.3 | 93 | 24 | 1.27 | 0.1 | 0.8 | 127 | 930 | 48 | 5 |
| 19 | Octadecyl alcohol | " | 215 | 54.1 | 7.6 | 87 | 22 | 1.15 | 0.1 | 0.9 | 120 | 950 | 47 | 3 |
| 20 | Benzyl alcohol | " | 207 | 53.8 | 5.4 | 92 | 25 | 1.23 | 0.1 | 0.8 | 132 | 920 | 50 | 5 |
| 21 | Phenol | " | 196 | 54.0 | 4.8 | 93 | 25 | 1.30 | 0.3 | 0.9 | 130 | 920 | 51 | 4 |
| 22 | p-Cumyl phenol | " | 223 | 52.7 | 5.3 | 85 | 22 | 1.10 | 0.2 | 0.8 | 115 | 940 | 45 | 3 |
| 23 | β-Naphthol | " | 181 | 56.3 | 5.5 | 89 | 24 | 1.35 | 0.4 | 1.0 | 120 | 930 | 47 | 5 |
| 24 | Acetone | 0.5 | 382 | 52.0 | 7.3 | 83 | 21 | 0.85 | 0.1 | 1.0 | 113 | 940 | 43 | 4 |
| 25 | Acetophenone | " | 389 | 51.8 | 6.9 | 83 | 21 | 0.83 | 0.2 | 0.8 | 117 | 930 | 43 | 5 |
| 26 | Benzophenone | " | 356 | 52.3 | 6.4 | 84 | 22 | 0.97 | 0.2 | 0.9 | 115 | 930 | 45 | 5 |
| 27 | Acetaldehyde | " | 394 | 50.6 | 7.5 | 75 | 20 | 0.82 | 0.1 | 1.0 | 108 | 950 | 40 | 3 |
| 28 | Octylaldehyde | " | 388 | 50.9 | 7.1 | 77 | 20 | 0.85 | 0.3 | 0.9 | 110 | 950 | 42 | 4 |
| 29 | Benzaldehyde | " | 373 | 51.9 | 6.7 | 83 | 21 | 0.90 | 0.4 | 0.8 | 112 | 950 | 43 | 5 |
| 30 | α-Napthaldehyde | " | 364 | 51.7 | 6.8 | 83 | 21 | 0.92 | 0.3 | 0.8 | 115 | 940 | 43 | 3 |
| 31 | Acetyl chloride | 0.33 | 84 | 75.3 | 7.8 | 108 | 39 | 1.53 | 0.3 | 0.7 | 156 | 790 | 67 | 13 |
| 32 | Benzoyl chloride | " | 92 | 74.0 | 7.5 | 104 | 37 | 1.46 | 0.4 | 0.6 | 150 | 780 | 69 | 11 |
| 33 | p-Tolyl chloride | " | 98 | 73.3 | 7.2 | 102 | 33 | 1.41 | 0.5 | 0.6 | 147 | 750 | 65 | 11 |
| 34 | Acetamide | " | 107 | 72.5 | 6.1 | 102 | 37 | 1.45 | 0.5 | 0.7 | 165 | 800 | 65 | 10 |
| 35 | Benzamide | " | 125 | 71.2 | 5.9 | 100 | 41 | 1.37 | 0.3 | 0.6 | 180 | 770 | 68 | 9 |
| 36 | Toluamide | " | 136 | 69.0 | 5.7 | 98 | 42 | 1.40 | 0.3 | 0.6 | 176 | 780 | 69 | 9 |
| 37 | Methylamine | " | 154 | 65.7 | 6.5 | 97 | 35 | 1.21 | 0.5 | 0.8 | 134 | 880 | 60 | 8 |
| 38 | Tributylamine | " | 139 | 68.7 | 6.3 | 98 | 33 | 1.34 | 0.3 | 0.7 | 143 | 860 | 63 | 9 |
| 39 | Aniline | " | 147 | 67.9 | 6.3 | 98 | 39 | 1.35 | 0.4 | 0.7 | 140 | 870 | 61 | 8 |
| 40 | Pyridine | " | 121 | 71.5 | 6.6 | 102 | 36 | 1.29 | 0.6 | 0.8 | 137 | 880 | 59 | 10 |
| 41 | Acetonitrile | " | 96 | 73.6 | 6.2 | 104 | 31 | 1.47 | 0.5 | 0.8 | 149 | 840 | 63 | 7 |
| 42 | Benzonitrile | " | 113 | 72.0 | 5.7 | 102 | 34 | 1.26 | 0.3 | 0.7 | 155 | 790 | 66 | 9 |
| 43 | Tolunitrile | " | 127 | 70.8 | 5.5 | 100 | 35 | 1.20 | 0.3 | 0.7 | 153 | 790 | 65 | 9 |
| 44 | Acetic anhydride | " | 138 | 68.9 | 7.0 | 98 | 30 | 1.15 | 0.4 | 0.9 | 142 | 850 | 53 | 7 |

Table 1-continued

| Ex. | Electron donor Compound | Amount (m-moles/l) | Yield of polymer (g/hr) | Propylene content (mole %) | Standard deviation (mole %) | Melting point (°C.) | Heat of fusion (joules/g) | Intrinsic viscosity (dl/g) | n-Heptane-insoluble content (wt. %) | Methyl acetate-soluble content (wt. %) | Tensile strength at break (%) | Elongation at break (%) | Hardness (JISC) | Haze (%) |
|---|---|---|---|---|---|---|---|---|---|---|---|---|---|---|
| 45 | Benzoic anhydride | " | 129 | 70.8 | 6.8 | 100 | 34 | 1.19 | 0.4 | 0.8 | 144 | 850 | 54 | 7 |
| 46 | Phthalic anhydride | " | 115 | 71.9 | 7.3 | 102 | 33 | 1.23 | 0.5 | 1.0 | 130 | 890 | 50 | 9 |
| 47 | Acetic acid | 0.5 | 213 | 54.9 | 5.3 | 87 | 23 | 1.37 | 0.3 | 0.8 | 146 | 750 | 50 | 7 |
| 48 | Undecylenic acid | " | 208 | 55.1 | 5.5 | 87 | 23 | 1.39 | 0.3 | 0.7 | 142 | 770 | 51 | 5 |
| 49 | Benzoic acid | " | 220 | 53.0 | 5.0 | 86 | 22 | 1.30 | 0.2 | 0.7 | 145 | 750 | 50 | 7 |
| 50 | Methyl isocyanate | 0.03 | 70 | 77.9 | 6.3 | 115 | 42 | 1.40 | 0.7 | 0.9 | 164 | 800 | 78 | 10 |
| 51 | Phenyl isocyanate | " | 89 | 75.1 | 5.9 | 108 | 43 | 1.35 | 0.5 | 0.7 | 160 | 830 | 77 | 9 |
| 52 | α-Naphthyl isocyanate | " | 75 | 77.4 | 6.2 | 114 | 43 | 1.39 | 0.6 | 0.9 | 166 | 780 | 75 | 10 |

EXAMPLES 53 TO 55

The procedure of Example 1 was repeated except that the polymerization temperatures were changed. The results are shown in Table 2.

Table 2

| Ex. | Electron donor (3) | Polymerization temperature (°C.) | Yield of polymer (g/hr) | Propylene content (mole %) | Standard deviation (mole %) | Melting point (°C.) | Heat of fusion (joules/g) | Intrinsic viscosity (dl/g) | n-heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|---|---|
| 53 | Methyl p-toluate | 50 | 160 | 73.8 | 3.8 | 108 | 55 | 3.63 | 0.4 | 0.2 | 227 | 690 | 86 | 12 |
| 1 | " | 70 | 141 | 66.5 | 3.6 | 99 | 53 | 1.67 | 0.1 | 0.3 | 208 | 710 | 81 | 10 |
| 54 | " | 100 | 31 | 81.2 | 7.6 | 119 | 57 | 2.81 | 1.5 | 0.2 | 221 | 690 | 85 | 17 |
| 55 | " | 120 | 30 | 83.4 | 9.3 | 125 | 63 | 2.54 | 2.1 | 0.9 | 163 | 870 | 91 | 21 |

EXAMPLES 56 TO 59

The same procedure as in Example 1 was repeated except that the ratio between propylene and 1-butene in the gaseous mixture was changed. The results are shown in Table 3. Table 3 also gives the results of Example 1.

COMPARATIVE EXAMPLE 1

This example shows that when a copolymer having a high propylene content is prepared, it does not become a homogeneous solution, and the copolymer does not have superior properties.

The procedure of Example 1 was repeated except that the gaseous mixture of propylene and 1-butene consisted of 90 mole% of propylene and 10 mole% of 1-butene. The results of polymerization are shown in Table 3.

In this polymerization, the viscosity of the polymer solution became extremely high, and the copolymer partly precipitated and adhered to the wall of the reactor or to the stirring vanes so that a homogeneous polymerization reaction could not be performed. The copolymer obtained has poor transparency. The results are shown in Table 3.

Table 3

| Ex. | Feed gas (mole ratio of propylene/1-butene) | Yield of polymer (g/hr) | Propylene content (mole %) | Standard deviation (mole %) | Melting point (°C.) | Heat of fusion (joules/g) | Intrinsic viscosity (dl/g) | n-Heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|---|
| 56 | 30/70 | 102 | 41.4 | 4.0 | 51 | 36 | 1.75 | 0.4 | 0.4 | 180 | 740 | 63 | 6 |
| 57 | 50/50 | 124 | 51.6 | 4.1 | 72 | 47 | 1.73 | 0.3 | 0.3 | 226 | 630 | 75 | 7 |
| 1 | 65/35 | 141 | 66.5 | 3.6 | 99 | 53 | 1.67 | 0.3 | 0.3 | 208 | 710 | 81 | 10 |
| 58 | 70/30 | 156 | 77.6 | 3.2 | 113 | 57 | 1.72 | 0.3 | 0.3 | 212 | 640 | 85 | 12 |
| 59 | 85/15 | 172 | 89.8 | 4.5 | 135 | 66 | 1.76 | 0.2 | 0.2 | 240 | 630 | 95 | 25 |
| Compara- | | | | | | | | | | | | | | |

Table 3-continued

| Ex. | Feed gas (mole ratio of propylene/ 1-butene) | Yield of polymer (g/hr) | Propylene content (mole %) | Standard deviation (mole %) | Melting point (°C.) | Heat of fusion (joules/ g) | Intrinsic viscosity (dl/g) | n-Heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|---|
| tive Ex. 1 | 90/10 | 168 | 95.1 | 6.8 | 149 | 74 | 1.75 | 1.2 | 1.2 | 222 | 680 | 99 | 43 |

EXAMPLE 60

The same procedure as in Example 1 was repeated except that a gaseous mixture consisting of 3 mole% of ethylene, 64 mole% of propylene and 33 mole% of 1-butene was fed instead of the propylene/1-butene gaseous mixture. A copolymer was obtained at a rate of 158 g/hour.

The copolymer had a melting point of 95° C., a heat press sheet fabricated from the copolymer had no surface tackiness.

EXAMPLES 61 TO 72

The same procedure as in Example 1 was repeated except that a solid complex (1) was prepared using each of the electron donors shown in Table 4 instead of ethyl benzoate, and used in the polymerization. The results are shown in Table 4.

Table 4

| | Catalyst preparing conditions | | Results of analysis | |
|---|---|---|---|---|
| Ex. | Electron donor | Amount (ml) | Ti (wt. %) | Cl (wt. %) |
| 61 | i-Amyl ether | 3.5 | 2.2 | 66 |
| 62 | Methyl benzoate | 4.0 | 2.0 | 66 |
| 63 | Ethyl anisate | 4.5 | 2.1 | 64 |
| 64 | Isopropyl benzoate | 4.0 | 2.0 | 65 |
| 65 | Ethyl benzoate | 4.0 | | |
| 66 | TiCl₄ | 0.1 | 2.5 | 65 |
| | Ethyl benzoate | 3.0 | | |
| 67 | Anisole | 1.0 | 2.1 | 64 |
| | N,N,N',N'-tetramethyl ethylenediamine | 1.0 | | |
| 68 | Methyl benzoate | 4.0 | 2.0 | 65 |
| | Ethyl benzoate | 3.0 | | |
| 69 | n-Buthanol | 1.0 | 2.2 | 64 |
| | Methyl benzoate | 2.0 | | |
| 70 | o-Cresol | 2.0 | 2.5 | 66 |
| | Ethyl benzoate | 3.0 | | |
| 71 | Benzaldehyde | 1.5 | 2.0 | 65 |
| | Ethyl anisate | 4.0 | | |
| 72 | Benzonitrile | 0.5 | 2.1 | 64 |
| | Benzoyl chloride | 1.0 | | |
| | Ethyl benzoate | 4.0 | 2.2 | 65 |

Results of polymerization

| Ex. | Yield of polymer (g/hr) | Propylene content (mole %) | Standard deviation (mole %) | Melting point (°C.) | Heat of fusion (Joules/ g) | Intrinsic viscosity (dl/g) | n-heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|
| 61 | 127 | 71.0 | 3.9 | 100 | 47 | 1.79 | 0.2 | 0.1 | 210 | 700 | 85 | 10 |
| 62 | 136 | 68.4 | 3.8 | 99 | 48 | 1.71 | 0.1 | 0.3 | 215 | 690 | 83 | 10 |
| 63 | 145 | 66.0 | 4.0 | 98 | 49 | 1.64 | 0.3 | 0.5 | 203 | 720 | 79 | 9 |
| 64 | 143 | 66.1 | 4.1 | 98 | 47 | 1.66 | 0.2 | 0.5 | 204 | 720 | 80 | 10 |
| 65 | 154 | 64.7 | 3.6 | 96 | 52 | 1.53 | 0.1 | 0.2 | 200 | 730 | 77 | 9 |
| 66 | 158 | 64.3 | 4.5 | 96 | 51 | 1.51 | 0.1 | 0.3 | 200 | 730 | 76 | 9 |
| 67 | 130 | 69.8 | 4.3 | 100 | 54 | 1.75 | 0.3 | 0.4 | 217 | 690 | 84 | 10 |
| 68 | 147 | 65.9 | 4.1 | 98 | 48 | 1.63 | 0.3 | 0.3 | 216 | 690 | 84 | 10 |
| 69 | 128 | 70.8 | 4.3 | 100 | 49 | 1.79 | 0.3 | 0.3 | 218 | 680 | 85 | 10 |
| 70 | 154 | 64.9 | 3.9 | 96 | 47 | 1.54 | 0.2 | 0.2 | 205 | 710 | 83 | 9 |
| 71 | 138 | 68.2 | 4.0 | 99 | 48 | 1.70 | 0.4 | 0.4 | 210 | 700 | 85 | 9 |
| 72 | 125 | 71.0 | 4.4 | 100 | 49 | 1.80 | 0.4 | 0.5 | 214 | 690 | 85 | 9 | of fusion of 46 joules/g, an intrinsic viscosity of 2.05 dl/g, a boiling n-heptane-insoluble content of 0.4%, a boiling methyl acetate-soluble content of 0.4%, a tensile strength at break of 195 kg/cm², an elongation at break of 730%, a JIS C hardness of 76, and a haze of 14%. A

EXAMPLE 73

Anhydrous magnesium chloride (0.1 mol) was suspended in 300 ml of kerosene, and 0.4 mole of ethanol and 0.1 mole of ethyl benzoate were added at room temperature. The mixture was stirred for 1 hour. Then, 0.3 mole of diethylaluminum chloride was added dropwise at room temperature, and the mixture was stirred for 1 hour. The solid portion of the product was collected, well washed with kerosene, and suspended in 300 ml of a kerosene solution containing 30 ml of titanium tetrachloride. The reaction was performed at 80° C. for 2 hours. After the reaction, the supernatant liquid was removed by decantation, and the solid portion was washed sufficiently with fresh kerosene to afford a solid complex catalyst ingredient (1) containing 2.5% by weight of titanium, 58.0% by weight of chlorine and 9.5% by weight of ethyl benzoate, and had a surface area of 180 m$^2$/g.

Using the complex (1) obtained, copolymerization was carried out in the same way as in Example 1. The results are shown in Table 5.

EXAMPLE 74

Anhydrous magnesium chloride (20 g), 5.0 ml of ethyl benzoate and 3.0 ml of kerosene were charged under an atmosphere of nitrogen into a stainless steel (SUS-32) ball mill cylinder having an inner capacity of 800 ml and an inside diameter of 100 mm which accommodated therein 100 stainless steel (SUS-32) balls with a diameter of 15 mm, and were contacted and pulverized for 120 hours at 125 rpm. The resulting copulverized product was suspended in 100 ml of kerosene, and 20 millimoles of triethyl aluminum was added. The mixture was stirred at room temperature for 1 hour. After the reaction, the solid portion was collected by filtration, and washed fully with hexane. The resulting solid product was suspended in 100 ml of kerosene containing 10 millimoles of titanium tetrachloride, and reacted at room temperature for 1 hour. The solid was collected by filtration, and washed fully with hexane to afford a titanium-containing solid catalyst ingredient (1) which contained 1.5% by weight of titanium, 57.0% by weight of chlorine, 16.0% by weight of ethyl benzoate and 0.5% by weight of aluminum and had a specific surface area of 134 m$^2$/g.

Using the resulting complex (1), copolymerization was performed in the same way as in Example 1. The results are shown in Table 5.

EXAMPLE 75

Ten grams of the titanium-containing solid catalyst ingredient obtained in Example 1 was further treated in the following manner.

It was suspended in 200 ml of kerosene, and 2.1 millimoles of triethyl aluminum was added dropwise at room temperature, and the mixture was stirred for 30 minutes. After the reaction, 2.1 millimoles of ethyl benzoate was added dropwise, and the mixture was stirred for 30 minutes. After the reaction, 2.1 millimoles of titanium tetrachloride was added dropwise, and the mixture was stirred for 30 minutes. After the reaction, the solid portion was collected by filtration, and washed fully with hexane to afford a titanium-containing solid catalyst complex (1) which contained 2.2% by weight of titanium, 64% by weight of chlorine and 9.9% by weight of ethyl benzoate.

Using the resulting complex (1), copolymerization was performed in the same way as in Example 1. The results are shown in Table 5.

EXAMPLE 76

Commercially available magnesium methoxide (0.2 mole) was charged into a round-bottomed flask under an atmosphere of nitrogen, and 0.4 mole of o-cresol and 200 ml of hexane were added. With stirring, the temperature of the mixture was raised, and the mixture was distilled. The distillate was removed to afford Mg(OC$_6$H$_4$CH$_3$)$_2$.

Then, 0.2 mole of Mg(OC$_6$H$_4$CH$_3$)$_2$ and 0.02 mole of ethyl benzoate were charged into the same ball mill pot as used in Example 74, and copulverized for 120 hours at 125 rpm in an atmosphere of nitrogen.

The solid product obtained was suspended in 200 ml of titanium tetrachloride, and reacted for 2 hours at 80° C. After the reaction, the solid portion was collected by filtration, and washed well with hexane to afford a titanium-containing solid catalyst complex (1) which contained 3.2% by weight of titanium, 57% by weight of chlorine and 9.8% by weight of ethyl benzoate.

Using the resulting complex (1), copolymerization was performed in the same way as in Example 1. The results are shown in Table 5.

EXAMPLE 77

A reactor equipped with a reflux condenser was charged with 200 ml of a commercially available Grignard reagent (C$_2$H$_5$MgCl, tetrahydrofuran solution, 2 moles/liter) under an atmosphere of nitrogen, and 0.4 mole of p-cresol was gradually added dropwise to synthesize MgCl(OC$_6$H$_4$CH$_3$). At this time, the reaction mixture was maintained at room temperature by cooling with ice. The tetrahydrofuran was removed by decantation, and 200 ml of purified kerosene and 0.1 mole of ethyl benzoate were added. After the addition, the temperature was raised to 80° C., and the reaction was performed for 2 hours. The solid portion was collected by filtration, and washed well with purified hexane.

The resulting reaction product was suspended in 300 ml of titanium tetrachloride, and with stirring, the reaction was performed at 90° C. for 2 hours. After the reaction, the solid portion was collected by filtration, and washed fully with hexane to afford a titanium-containing solid catalyst component (1) which contained 3.0% by weight of titanium and 57% by weight of chlorine.

Using the resulting complex (1), copolymerization was performed in the same way as in Example 1. The results are shown in Table 5.

Table 5

| Ex. | Yield of polymer (g/hr) | Propylene content (mole %) | Standard deviation (mole %) | Melting point (°C.) | Heat of fusion (joules/g) | Intrinsic viscosity (dl/g) | n-Heptane insoluble content (wt. %) | Methyl acetate soluble content (wt. %) | Tensile strength at break (kg/cm$^2$) | Elongation at break (%) | Hardness (JISC) | Haze (%) |
|---|---|---|---|---|---|---|---|---|---|---|---|---|
| 73 | 123 | 72.0 | 3.8 | 101 | 48 | 1.80 | 0.2 | 0.3 | 203 | 710 | 82 | 13 |
| 74 | 120 | 72.3 | 4.0 | 101 | 46 | 1.83 | 0.3 | 0.2 | 205 | 705 | 82 | 12 |
| 75 | 137 | 68.2 | 3.7 | 100 | 55 | 1.72 | 0.2 | 0.4 | 212 | 700 | 81 | 11 |
| 76 | 145 | 65.3 | 3.6 | 97 | 51 | 1.61 | 0.1 | 0.4 | 204 | 720 | 79 | 9 |

Table 5-continued

| Ex. | Yield of polymer (g/hr) | Propylene content (mole %) | Standard deviation (mole %) | Melting point (°C.) | Heat of fusion (joules/g) | Intrinsic viscosity (dl/g) | n-Heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|
| 77 | 140 | 67.8 | 3.8 | 100 | 54 | 1.63 | 0.2 | 0.3 | 209 | 710 | 82 | 12 |

EXAMPLES 78 to 80

The procedure of Example 1 was repeated except that the complex (1) was prepared by using 100 ml of each of the trichloroalkoxy titaniums shown in Table 6 instead of titanium tetrachloride, and used in the polymerization. The results are shown in Table 6.

these compounds in the reactor were maintained at 10 millimoles/liter as titanium), and 20 millimoles/liter, respectively. As a result, a copolymer was obtained at a rate of 20 g/hour.

The copolymer had a propylene content of 70.4 mole%, a standard deviation of propylene content of 15.7 mole%, an intrinsic viscosity of 1.49 dl/g, a boiling Table 6

| Ex. | Ti compound | Results of analysis Ti (wt. %) | Cl (wt. %) |
|---|---|---|---|
| 78 | Ti(OCH₃)Cl₃ | 1.5 | 63 |
| 79 | Ti(OC₂H₅)Cl₃ | 1.6 | 64 |
| 80 | Ti(O-n-C₄H₉)Cl₃ | 1.3 | 62 |

Results of polymerization

| Ex. | Yield of polymer (g/hr) | Propylene content (mole %) | Standard deviation (mole %) | Melting point (°C.) | Heat of fusion (Joules/g) | Intrinsic viscosity (dl/g) | n-heptane insoluble content (wt. %) | Methyl acetate soluble content (wt. %) | Tensile strength at break (kg/cm²) | Elongation at break (%) | Hardness (JISC) | Haze (%) |
|---|---|---|---|---|---|---|---|---|---|---|---|---|
| 78 | 43 | 79.6 | 3.7 | 123 | 54 | 2.45 | 0.7 | 0.2 | 229 | 630 | 90 | 17 |
| 79 | 49 | 78.1 | 3.9 | 121 | 51 | 2.38 | 0.5 | 0.3 | 225 | 650 | 88 | 15 |
| 80 | 56 | 77.3 | 3.9 | 120 | 52 | 2.33 | 0.5 | 0.2 | 224 | 650 | 89 | 15 |

COMPARATIVE EXAMPLE 2

This example shows a copolymerization reaction which was carried out using titanium trichloride (obtained by reducing titanium tetrachloride with 2 times its amount in mole of diethylaluminum chloride) as one component of the catalyst.

The procedure of Example 1 was performed except that instead of the catalyst ingredients (1), (2) and (3), titanium trichloride and diethylaluminum chloride were fed so that their concentrations became 5.0 millimoles/liter (as titanium) and 50 millimoles/liter, respectively. As a result, a copolymer was obtained at a rate of 48 g/hour.

The resulting copolymer had a propylene content of 65.8 mole%, a standard deviation of propylene content distribution of 11.3 mole%, an intrinsic viscosity of 1.07 dl/g, a boiling n-heptane-insoluble content of 7.6% and a boiling methyl acetate-soluble content of 3.5%. Two melting points (68° and 108° C.) were observed in the thermogram of this copolymer, and this led to the confirmation that the propylene content distribution of the copolymer was wide.

The copolymer had a tensile strength at break of 171 kg/cm², an elongation at break of 730%, a JIS C hardness of 85, and a Haze of 37%. A press sheet fabricated from the copolymer had some tackiness at its surface.

COMPARATIVE EXAMPLE 3

This example shows a copolymerization reaction which was carried out using titanium trichloride-A (obtained by reducing titanium tetrachloride with metallic aluminum) as one ingredient of the catalyst.

The procedure of Example 1 was repeated except that instead of the catalyst ingredients (1), (2) and (3), titanium trichloride A and diethylaluminum chloride were fed into the reactor so that the concentrations of n-heptane-insoluble content of 5.4% and a boiling methyl acetate-soluble content of 4.1%. Two melting points (63° and 99° C.) were observed in the thermogram of this copolymer, and this led to the confirmation that the propylene content distribution of the copolymer was wide.

The copolymer also had a tensile strength at break of 125 kg/cm², an elongation at break of 720%, a JIS C hardness of 64 and a haze of more than 50%. A press sheet fabricated from the copolymer had surface tackiness.

COMPARATIVE EXAMPLE 4

This example shows the preparation of a low crystalline propylene/1-butene copolymer in accordance with a conventional method (Japanese Laid-Open Patent Publication No. 38787/75).

The procedure of Example 4 was repeated except that instead of the catalyst ingredients (1), (2) and (3), 28.4 millimoles of titanium trichloride A and 14.2 millimoles of triethyl aluminum were used, and the copolymerization was carried out at 140° C. As a result, 92 g of a copolymer was obtained.

The copolymer had a propylene content of 76.7 mole%, a standard deviation of propylene content of 16.8 mole%, a melting point of 109° C., a heat of fusion of 29 joules/g, an intrinsic viscosity of 2.44 dl/g, a boiling n-heptane-insoluble content of 3.2%, and a methyl acetate-soluble content of 3.3%.

The copolymer had a tensile strength at break of 90 kg/cm², an elongation at break of 770%, a JIS C hardness of 37 and a haze of more than 50%. Thus, it had poor transparency. A press sheet fabricated from the copolymer had surface tackiness.

COMPARATIVE EXAMPLE 5

This example shows that a propylene/1-butene copolymer having a very low crystallinity has inferior strength to the crystalline copolymer in accordance with this invention.

Propylene and 1-butene were copolymerized using vanadium oxytrichloride and diethylaluminum chloride as a polymerization catalyst. A 1-liter nitrogen-purged glass reactor was charged with 500 ml of hexane and then 35 millimoles of diethylaluminum chloride. The inside atmosphere was replaced by a gaseous mixture consisting of 65 mole% of propylene and 35 mole% of 1-butene, and the gaseous mixture was dissolved and saturated at 20° C. Then, 4 millimoles of vanadium oxytrichloride was added, and the polymerization was started. While feeding the gaseous mixture into the reactor, the copolymerization was performed at 20° C. for 10 minutes. Methanol (1 ml) was added to the polymer solution to stop the polymerization. The product was treated in the same way as in Example 1 to afford 21 g of a copolymer of propylene and 1-butene.

The copolymer had a propylene content of 67.3 mole%, an intrinsic viscosity of 1.54 dl/g, a boiling n-heptane insoluble content of 0%, and a boiling methyl acetate-soluble content of 0.6%. No melting point was observed in the copolymer (the heat of fusion was 0). The copolymer had a tensile strength at break of 20 kg/cm$^2$ and an elongation at break of 1000%, thus showing inferior strength characteristics to the copolymers of this invention.

COMPARATIVE EXAMPLE 6

This example shows the production of a propylene/1-butene copolymer in accordance with a known method (British Pat. No. 1018341).

The same stainless steel autoclave as used in Example 4 was charged with 300 ml of hexane, 3.8 moles of propylene, 2.5 moles of 1-butene, 29.4 millimoles of ethylaluminum dichloride, 22.8 millimoles of hexamethyl phosphoramide and 39.3 millimoles of titanium trichloride A. The copolymerization was carried out at an initial polymerization pressure of 17 kg/cm$^2$.G and a polymerization temperature of 75° C. for 1 hour to afford 212 g of a copolymer.

The copolymer had a propylene content of 59.2 mole%, a standard deviation of propylene content of 12.1 mole%, a melting point of 134° C., a heat of fusion of 71 joules/g, an intrinsic viscosity of 4.03 dl/g, a boiling n-heptane-insoluble content of 17.3%, a boiling methyl acetate-soluble content of 2.5%, a tensile strength at break of 206 kg/cm$^2$, an elongation at break of 670%, a JIS C hardness of 85, and a haze of 30%.

COMPARATIVE EXAMPLE 7

Using a 1-liter glass autoclave equipped with stirring vanes, a gaseous mixture of propylene and 1-butene was fed at a certain predetermined pressure and polymerized.

The autoclave was charged with 500 ml of hexane, and 0.5 millimole of triethyl aluminum. A gaseous mixture consisting of 77 mole% of propylene and 23 mole% of 1-butene was fed at a pressure of 4 kg/cm$^2$.G into the autoclave, and 0.5 millimole of titanium trichloride A was added. The polymerization was started, and performed at 90° C. for 1 hour while incessantly feeding the propylene/1-butene gaseous mixture under the predetermined pressure. A copolymer was obtained in an amount of 63 g.

The copolymer had a propylene content of 79.9 mole%, a standard deviation of propylene content of 13.2 mole%, a melting point of 118° C., a heat of fusion of 33 joules/g, an intrinsic viscosity of 2.32 dl/g, a boiling n-heptane-insoluble content of 12.8%, a boiling methyl acetate-soluble content of 2.1%, a tensile strength at break of 49 kg/cm$^2$, an elongation at break of 440% and a haze of 22%. A press sheet fabricated from the copolymer had surface tackiness.

What we claim is:

1. A random copolymer consisting essentially of 40 to 90 mole% of propylene and 60 to 10 mole% of 1-butene, and having
    (A) a boiling n-heptane-insoluble content of not more than 5% by weight based on the weight of the copolymer,
    (B) a boiling methyl acetate-soluble content of not more than 2% by weight based on the weight of the copolymer,
    (C) a melting point, determined by differential thermal analysis, of 40° to 140° C.,
    (D) an intrinsic viscosity, determined in decalin at 135° C., of 0.5 to 6 dl/g,
    (E) an elongation at break, measured by JIS K6301, of at least 300%,
    (F) a tensile strength at break, measured by JIS K6301, of at least 50 kg/cm$^2$, and
    (G) a haze, measured by JIS K6714, of not more than 40%.

2. The copolymer of claim 1 wherein the distribution of the propylene content has a standard deviation of not more than 15 mole%.

3. The copolymer of claim 1 which consists essentially of 60 to 85 mole% of propylene and 40 to 15 mole% of 1-butene.

4. The copolymer of claim 1 wherein the boiling n-heptane-insoluble content is not more than 3% by weight based on the weight of the copolymer.

5. The copolymer of claim 1 wherein the boiling methyl acetate-soluble content is not more than 1% by weight based on the weight of the copolymer.

6. The copolymer of claim 1 wherein the haze measured by JIS K6714 is not more than 30%.

7. The copolymer of claim 1 wherein the melting point Tm of the copolymer is 40° to 140° C. and satisfies the following expression:

$$1.4|y| - 16 \leq |Tm| \leq 1.4|y| + 30$$

wherein y is the content in mole% of propylene.

* * * * *